United States Patent
Hoemke

(10) Patent No.: US 6,186,045 B1
(45) Date of Patent: Feb. 13, 2001

(54) LATCHING VALVE AND A MULTIPLEXED HYDRAULIC CONTROL SYSTEM UTILIZING SAME

(75) Inventor: Brian E. Hoemke, Belvidere, IL (US)

(73) Assignee: Woodward Governor Company, Rockford, IL (US)

(*) Notice: Under 35 U.S.C. 154(b), the term of this patent shall be extended for 0 days.

(21) Appl. No.: 09/206,658

(22) Filed: Dec. 7, 1998

(51) Int. Cl.⁷ ...................................................... F15B 11/08
(52) U.S. Cl. .......................... 91/445; 91/536; 137/625.66; 137/625.6
(58) Field of Search .............................. 91/426, 445, 521, 91/522, 528, 529, 530, 536; 137/625.66, 625.6

(56) References Cited

U.S. PATENT DOCUMENTS

| | | | |
|---|---|---|---|
| 3,018,041 | * 1/1962 | Bidwell | 137/625.66 X |
| 3,874,414 | * 4/1975 | Dollison | 137/625.66 |
| 3,955,597 | * 5/1976 | Oneyama et al. | 137/625.66 X |
| 4,207,924 | * 6/1980 | Peters | 137/625.66 |
| 4,606,191 | * 8/1986 | Collins et al. | 60/734 X |
| 4,913,032 | 4/1990 | Wernberg | 91/361 |
| 4,966,065 | 10/1990 | Wardle | 91/361 |
| 4,984,505 | 1/1991 | Leeson et al. | 91/361 |
| 4,986,305 | 1/1991 | Richards et al. | . |
| 5,048,394 | 9/1991 | McLevige et al. | 91/361 |
| 5,054,369 | 10/1991 | Wardle et al. | 91/361 |
| 5,081,903 | 1/1992 | Wardle et al. | 91/361 |
| 5,088,383 | 2/1992 | Wardle et al. | 91/361 |
| 5,551,478 | 9/1996 | Veilleux, Jr. et al. | . |
| 5,996,464 | * 12/1999 | McLevige et al. | 91/461 X |

FOREIGN PATENT DOCUMENTS 2 174 824   11/1988 (GB).

* cited by examiner

Primary Examiner—John E. Ryznic
(74) Attorney, Agent, or Firm—Leydig, Voit & Mayer, Ltd.

(57) ABSTRACT

A latching valve, useable in a multiplexed fluid control system, is switchable between two positions to control working output fluid flow to a corresponding actuator. The valve is latched by deriving a holding force from the working output flow. The latching valve may reside in one of the channels of the multiplexed fluid control system and eliminates the required modulations to hold position and reduces system wear of modulating and multiplexing components. The latching valve includes a working output port coupled with an associated actuator and a control chamber connected to a 3-way multiplexing valve to receive fluid signals. To provide a latching force, the valve includes bleed conduit that bleeds a controlled amount of fluid between the working output port and the control chamber to maintain the pressure in the control chamber. The last position of the latching valve is held until the next selective fluid signal from the modulating valve and multiplexer is received.

14 Claims, 2 Drawing Sheets

LATCHING VALVE AND A MULTIPLEXED HYDRAULIC CONTROL SYSTEM UTILIZING SAME

FIELD OF THE INVENTION

The present invention generally relates to fluid control systems, and more particularly multiplexed hydraulic control systems.

BACKGROUND OF THE INVENTION

In the art of hydraulic control systems for control of engines, the trend is toward control over more mechanical variables in the engine to attempt an increase in engine efficiency and/or performance. Mechanical variables can include air and fuel valves, variable stator vanes, engine variable geometry, and the like. In prior engines, the common approach of controlling these mechanical variables has been to provide a dedicated hydraulic control for each mechanical variable. However, with the increased number of hydraulic controls has come undesirable increases in weight and size of the overall engine and a decrease in reliability. Such increases in weight and size also decrease the fuel efficiency of engines, particularly for gas turbine aircraft engines.

The concept of multiplexing a single hydraulic or pneumatic control to a plurality of channels is known as exemplified by Leeson et al., U.S. Pat. No. 4,984,505, the disclosure of which is hereby incorporated by reference. Multiplexed systems eliminate or reduce the need for several separate hydraulic controls while increasing overall reliability. Leeson illustrates such a multiplexing configuration in which a selectively positioned modulating valve moves linearly with respect to a rotating and multiplexing sleeve. The multiplexing sleeve periodically or sequentially delivers a modulated flow to individual output ports. In other multiplexing schemes, the multiplexer comprises a linearly moving valve as exemplified by McLevige et al., U.S. Pat. No. 5,048,394, the disclosure of which is also hereby incorporated by reference. In both rotary and linear multiplexing configurations, an intermediate second stage valve may be interposed between each multiplexer output and each actuator to integrate and/or amplify the signal to the actuator.

While these multiplexing systems reduce the number of hydraulic controls and increase reliability, a drawback with these prior hydraulic multiplexing configurations is that the modulating valve and multiplexer are frequently modulating flow to the second stage valves to correct for error and/or to maintain the last position of the intermediate second stage valves. Such frequent modulated flow may be necessary, for example, to correct for gradual fluid seepage from the control chamber of the second stage valve, which can cause the second stage to fall out of the desired position. These frequent modulations may cause fatigue and wear on the components of the system which may in turn reduce the life-span of the system. Such frequent modulations also can require a large quantity of electrical power.

There are also known attempts to configure a multiplexing scheme with latching valves that do not need updating to hold the last valve position. Such a configuration is exemplified in Veilleux, Jr. et al., U.S. Pat. No. 5,551,478. In Veilleux, a plurality of latching second stage valves switch between two positions by application of high pressure signals to one of two control ports corresponding with the two valve positions to change fluid flow to a corresponding actuator. A high pressure pulse on one port switches the valve from a first to a second position and the application of a high pressure pulse to the second port switches the valve back to its first position. The latching valves use internal ports and switches to low and high pressure inputs and an internal spring biasing mechanism to latch the valves in the current position until the appropriate high pressure pulse is delivered to the appropriate control port. However, a problem with this prior latching valve multiplexing system is its size, weight, and complexity, which are a disadvantage in aircraft systems and other systems where smaller size and weight is highly desired. In particular, Veilleux requires a 4-way multiplexing valve that has two control ports for each second stage latching valve. Each latching valve likewise has two control chambers and ports connected by separate conduits to the multiplexing valve. Furthermore, each latching valve requires two high pressure inputs and two low pressure inputs to maintain the latched position and produce an output to an actuator. The numerous ports increase the number of connecting conduits, the overall length or size of the multiplexing and latching valves, and therefore the complexity and weight of the system. Yet another problem with Veilleux is that the disclosed multiplexed fluid control system only provides positive high pressure pulses, and therefore it is not compatible with other variably positioned second stage valves which operate on positive and negative fluid signals. Such variably positioned second stage valves offer better control over mechanical variables which prefer more accurate control.

SUMMARY OF THE INVENTION

It is a general aim of the present invention to overcome these and other deficiencies existing in the art.

It is another general aim of the present invention to provide a practical and reliable multiplexed fluid control system that utilizes latching type valves.

It is therefore an object of the present invention to reduce the complexity and size of a latching valve for use in multiplexed fluid control systems.

In that regard, it is another object of the present invention to reduce the number of ports and connections necessary to latch a second stage valve.

It is another object to provide a latching valve that operates on negative and positive fluid signals from a 3-way multiplexing valve that alternatively pressures or exhausts a single port.

It is therefore a feature of the present invention to provide a latching valve in a channel of a multiplexed fluid control system that derives a holding or latching force from the working output pressure or flow between the latching valve and a corresponding actuator. The latching valve produces a working output flow that is determined by the current state of the valve. The current state of the valve is determined by the last fluid signal received in the channel and is held by the latching force.

It is another feature of the present invention to provide a simplified latching valve in a multiplexed fluid control system. The latching valve provides a control chamber for receiving fluid signals from the multiplexing and modulating means. The latching valve is switchable between two states by receipt of fluid signals in the control chamber. The state of the latching valve controls a working output fluid flow to an associated actuator. The latching valve further has a bleed conduit which connects the working output flow to the control chamber to maintain the fluid pressure in the control chamber and thereby latch the valve in its current state.

It is an aspect of the present invention that the bleed conduit has a restricted size to limit the flow rate through the bleed conduit so that fluid signals from the multiplexing valve cause the valves to switch states.

It is another feature of the present invention to provide a latching valve for a fluid control system that has a movable valve operator translatable between two positions within a valve body for regulating working fluid flow to a corresponding actuator. The valve body defines an inlet, an outlet, a control chamber, and a working output. The valve operator has a first position, which connects the inlet to the working output, and a second position, which connects the outlet to the working output. The position of the latching valve is controlled by fluid pressure in the control chamber. The latching valve also includes a bleed conduit connecting the working output to the control chamber for latching the valve in its current position.

It is another feature of the present invention that the latching valve is adapted to use positive or high-pressure fluid signals and negative or lower pressure fluid signals of a 3-way multiplexing valve. The latching valve may therefore be used in a multiplexed control system with other forms of second stage valves which use positive and negative fluid signals. The last fluid signal received in the control chamber determines the current position of the valve operator and therefore the current state of the second stage valve.

It is an advantage of the present invention that the valve provides for reduced size and reduced complexity. The latching valve may be of the spool type, or any other appropriate configuration, and can define the bleed conduit internally in the spool.

These and other objects and advantages of the invention will become more apparent from the following detailed description when taken in conjunction with the accompanying drawings.

Figure 1:
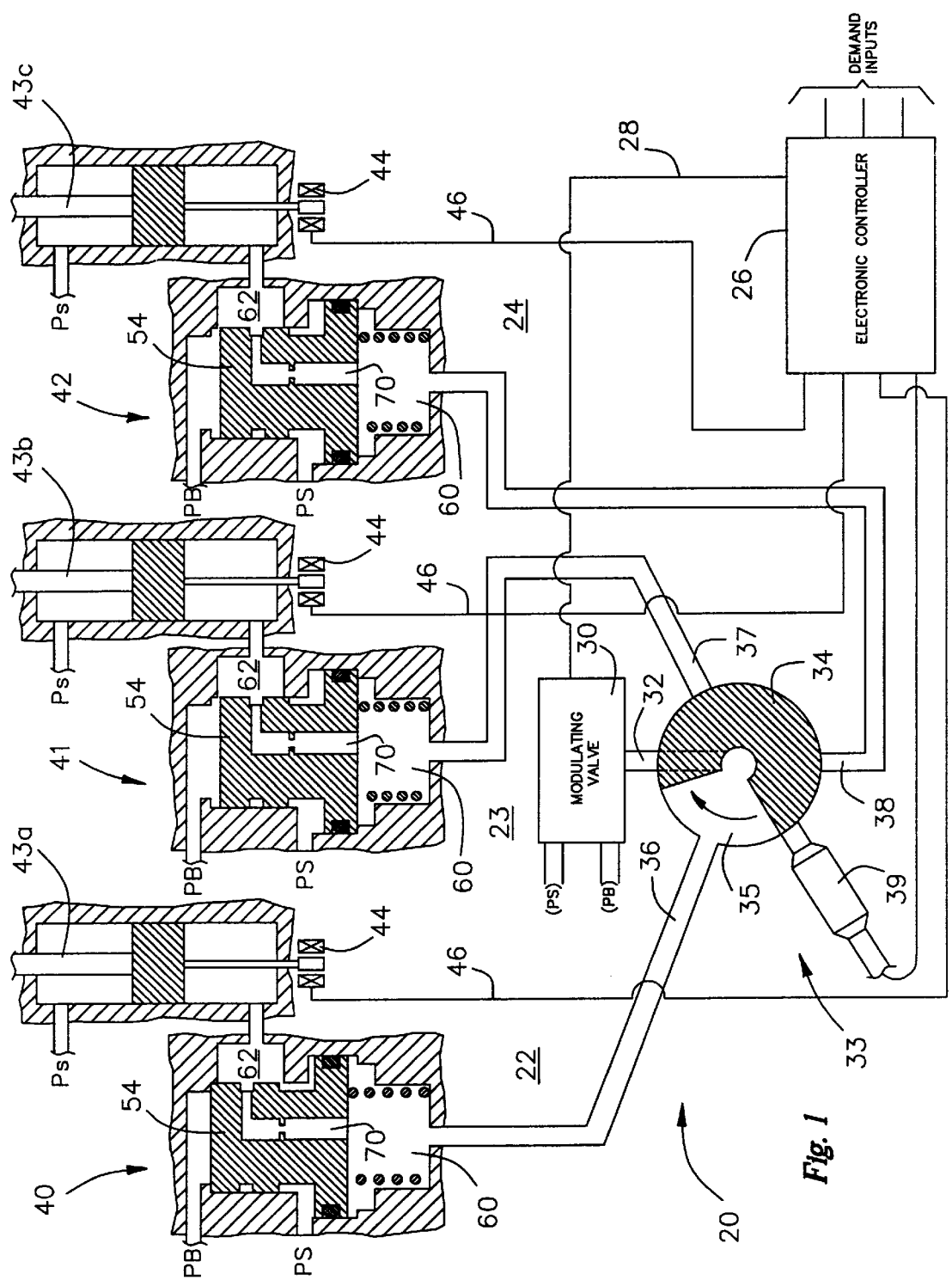
FIG. 1 is a partial schematic illustration showing a multiplexed fluid control system according to a preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration and referring to FIG. 1, a preferred embodiment of the present invention has been illustrated as a multiplexed hydraulic control system 20, shown in partial schematic form. Although an exemplary multiplexed system 20 is illustrated as the rotary and time division type similar to that shown in U.S. Pat. No. 4,984,505, it will be appreciated by those of skill in the art that the latching valve of the present invention can be used with a number of prior art multiplexed fluid control systems with similar benefits achieved, as will be developed in further detail below.

For simplicity of illustration, the exemplary multiplexed hydraulic control system 20 includes only three channels 22, 23, 24, each channel having a latching valve 40–42 and associated actuator 43a–43c therein. A preferred embodiment includes an electronic controller 26 that responds to electrical demand inputs to produce electrical commands transmitted by bus 28 to modulating means, shown schematically in FIG. 1 as a modulating valve 30. In accordance with the electrical commands, the modulating valve 30 selectively connects either a high-pressure hydraulic source (PS) or a lower pressure hydraulic sump (PB) to an input conduit 32 of a multiplexer 33. The modulating valve uses the hydraulic sump (PB) and the hydraulic source (PS) to produce relatively high magnitude fluid signals which correspond to large fluid flow rates. More specifically, the modulating valve 30 selectively connects the input conduit 32 to the sump (PB) or the source (PS) for short time intervals to provide a selected hydraulic flow rate through the input conduit. Fluid signals include positive fluid signals corresponding to a transitory connection to the higher-pressure hydraulic source (PS) and negative fluid signals corresponding to a transitory connection to the lower-pressure hydraulic sump (PB). The fluid signals that are fed through the input 32 are simultaneously distributed to a channel by a 3-way multiplexing valve 33, illustrated as a rotary commutator 34 having three control port outputs 36, 37, 38, or other suitable multiplexing means. The rotary commutator 34 includes an open segment 35 that sequentially connects the input conduit 32 to each of the outputs 36–38 for changing the states of the latching valves 40–42.

The states of the latching valves 40–42 control the working output flows to the associated actuators 43a–43c in the respective channels 22–24. As will be developed in further detail below, each latching valve 40–42 is switchable between two states by application of fluid signals to the channels 22–24. As seen in FIG. 1, latching valve 40 is shown in one of the two states referred to herein as an "ON" state while latching valves 41–42 are shown in the other state referred to herein as an "OFF" state. In the preferred embodiment, the "ON" state results from the application of positive fluid signals while the "OFF" state results from the application of negative fluid signals.

For control of the system, the electronic controller 26 receives an external demand signal for the demanded position of each actuator 43a–43c in each of the channels 22, 23, 24. Each actuator 43a–43c may include a position feedback device, such as a linear variable displacement transducer (LVDT) 44, which sends position feedback signals on a feedback line 46 to the electronic controller 26 for closed loop control if desired. The electronic controller 26 may then process the external demand signals and the position feedback signals on line 46 to determine if any of the corresponding latching valves 40–42 need to be switched between states.

If any of the latching valves 40–42 need to be switched between states, the electronic controller 26 commands the modulating valve 30 to provide an appropriate fluid signal to the associated channel while connected thereto. It will also be appreciated to those of skill in the art that the modulating valve 30 includes an electrical motor, such as a torque motor or a voice coil which is responsive to electric signals and positions the modulating valve in accordance therewith to provide a fluid signal. In the illustrated preferred embodiment, the rotary commutator 34 has a continuous rotational movement with feedback from a position indicator 39 to the electronic controller 26 indicating when a particular channel is open. Under this scheme, the electronic controller 26 sequences commands in time slots as channels 22–24 open and close to selectively apply fluid signals to each channel. However, it will be appreciated to those of skill in the art that in an alternative embodiment, the electronic controller may command a motor (not shown) to selectively rotate the commutator to connect the modulating valve to a channel that requires changing.

In accordance with the objective of providing a latching valve that operates on positive and negative fluid signals, a preferred embodiment provides simplified latching valves 40, 41, 42 in individual channels 22, 23, 24 which are latched in their current position until the next selective update from the modulating valve 30 and multiplexer 33. Referring now to latching valve 40 as exemplary as illustrated in greater detail in FIG. 2, the latching valve 40 includes a movable spool 54, or other appropriate valve operator, that rides in a cylindrical bore 56 formed in a valve body 58. The spool 54 includes an enlarged cylindrical end portion 59 fitted within an accommodating enlarged cylindrical intermediate portion 61 of the bore 56. The combination of the spool 54 and the bore 56 form a control chamber 60. As seen in FIG. 1, the control chamber 60 is coupled with a corresponding multiplexer output 36 for receiving respective fluid signals.

The valve body 58 defines a working output port 62, an inlet port 64, and an outlet port 66. In the exemplary multiplexed control system 20, the working output 62 is connected for fluid communication with the associated actuator 43, the inlet 64 is connected to a high-pressure source (PS), and the outlet 66 is connected to a lower pressure sump (PB). The working output port 62 is selectively connectable in the "ON" state through the bore 56 to the inlet 64 for providing control flow to the associated actuator 43, and in the "OFF" state to the outlet 66 for venting fluid from the associated actuator 43.

The spool 54 defines a bleed conduit 70 that connects the control chamber 60 with the working output port 62. The bleed conduit has an annular groove 71 formed on the outer radial periphery of spool 54 so that the angular position of the spool 54 does not affect the connection between the working output port 62 and the control chamber 60. The bleed conduit 70 also includes a restriction 72 to provide a limited cross-sectional area therein for limiting the flow rate through the bleed conduit 70, the function of which will be described more fully below. The spool 54 also defines an outer gasket retaining groove 76 with a ring gasket 78 compressed therein for preventing fluid seepage between the control chamber 60 and the inlet port 64. The spool 54 further defines an annular inlet groove 79 on the outer radial periphery thereof so that the inlet port 64 is connectable to the working output 62.

To provide for the "ON" and "OFF" states, the spool 54 has a limited range of movement within the bore 56 between corresponding "ON" and "OFF" positions. In particular, the spool 54 has a limited range of axial movement between two mechanical stops 80, 82 defined by the valve body 58. In the "ON" position, fluid can flow from the inlet 64 past the spool 54 to the working output 62 to drive the associated actuator 43 in a one direction, while, in the "OFF" position, fluid can be vented to the outlet 66 from the working output 62 to move the associated actuator 43 in the opposite direction.

The type of fluid signal last received in the control chamber 60 determines whether the working output port 62 is connected to the inlet 64 or the outlet 66. More specifically, a negative fluid signal from the modulating valve 30 vents fluid from the selected channel to reduce the fluid pressure in the control chamber 60. The lower pressure causes the spool 54 to axially translate to the "OFF" position wherein the outlet 66 is connected to the working output port 62. Similarly, a positive fluid signal from the modulating valve 30 adds fluid to the selected channel to increase the fluid pressure in the control chamber 60. The higher pressure causes the spool 54 to axially translate to the "ON" position wherein the inlet 64 is connected to the working output port 62. Also shown in the preferred embodiment is a spring 84 which may be used to pre-bias the spool 54 in one axial direction and thereby initialize the spool position at startup.

Figure 2:
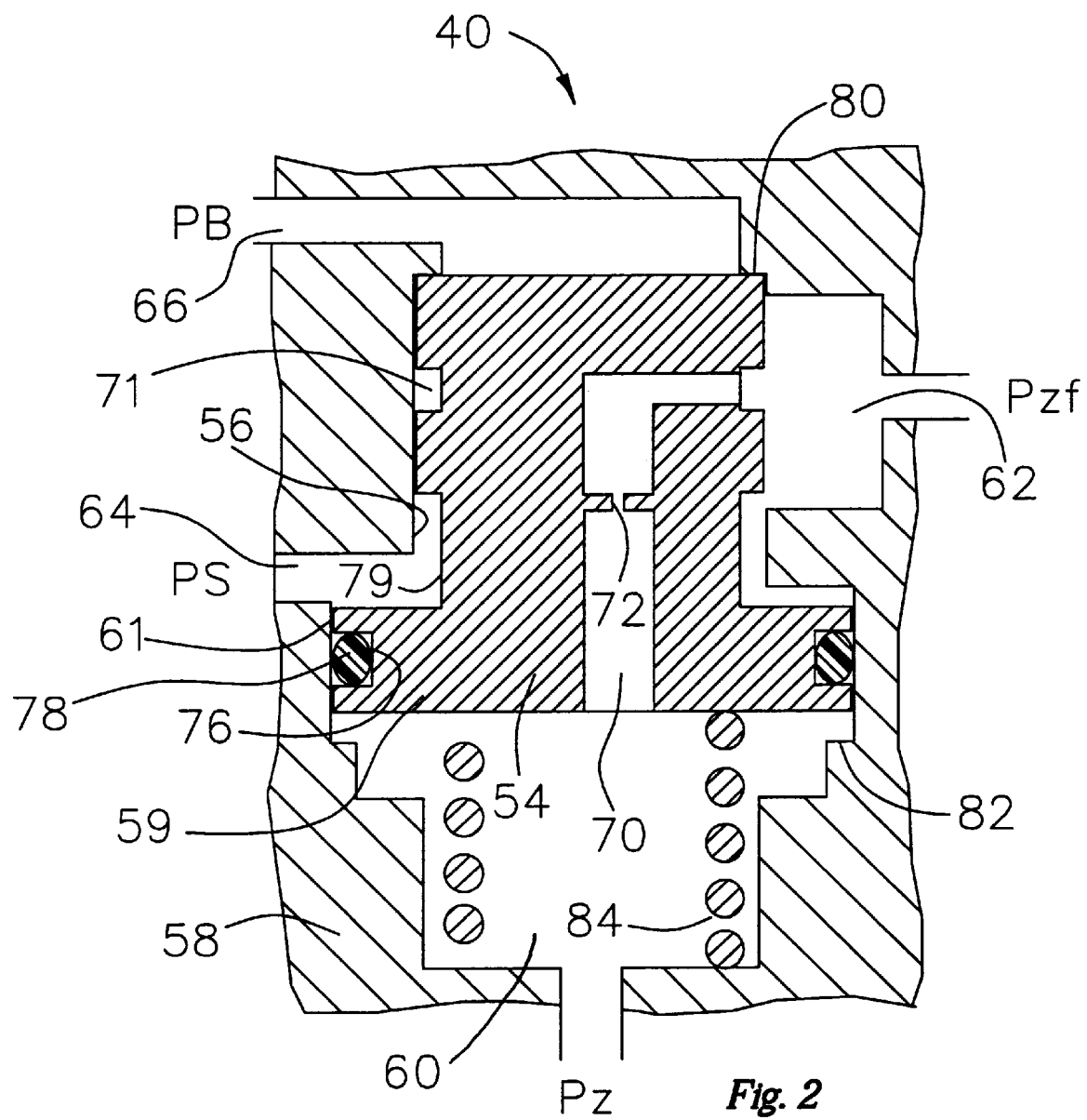
FIG. 2 is a cross-sectional fragmentary view of an exemplary latching valve used in FIG. 1 according to a preferred embodiment of the present invention.

In accordance with the aims, objectives and features of the present invention, a preferred embodiment derives a holding or latching force from the working output flow between the latching valve 40 and the corresponding actuator 43 to latch the spool 54 in its last position. Accordingly, fluid can bleed through the bleed conduit 70 between the control chamber 60 at pressure (Pz) and the working output port 62 at pressure (Pzf) to maintain the last position of the latching valve. The rate at which fluid bleeds through the bleed conduit 70 is controlled by the restriction 72 (the restriction may also be provided integrally by providing a smaller sized bleed conduit). Fluid bleed through the bleed conduit 70 maintains the necessary pressure in the control chamber 60 so that the spool 54 does not drop out of a latched position. It is an advantage that the bleed conduit 70 reduces the number of ports and connections necessary to latch the second stage valve 40 in their current position. Although the bleed conduit 70 could be defined by the valve body or externally on the valve, the spool 54 may define the bleed conduit 70 internally as shown in FIGS. 1 and 2 to further reduce ports needed in the valve body 58.

In the preferred embodiment, the flow through the bleed conduit 70 depends upon the position of the spool 54 in the latching valve 40. In the "ON" position, the fluid pressure (Pz) in the control chamber 60 is relatively high having received a positive or high pressure (PS) signal from the modulating valve 30. While in the "ON" position, the inlet 64 is connected to he working output port 62. As such, the pressure (Pzf) of the working output 62 is also relatively high, as there is only a small pressure drop across the spool 54. While in this "ON" position, fluid may gradually seep from the control chamber 60 back through the output 36 (see FIG. 1). To prevent this seepage from translating the spool 54 out of a latched position, fluid can bleed from the working output port 62 through the bleed conduit 70 to replace lost fluid pressure in the control chamber 60 thereby maintaining the latched position.

In the "OFF" position, the fluid pressure (Pz) in the control chamber 60 is relatively low having received a low pressure or negative fluid signal from the modulating valve 30. While in this position, fluid may seep from multiplexer 33 (see FIG. 1) to the control chamber 60 which tends to cause an increase in fluid pressure. In the "OFF" position, the pressure (Pzf) of the working output port 62 is relatively low as fluid is being drained from the actuator 43 to the outlet 66. Any pressure build up in the control chamber 60 is released or disposed of by fluid bleed from the control chamber through the bleed conduit 70 and to the working output port 62.

To switch the spool 54 between the "ON" and "OFF" positions, the modulating valve 30 is commanded to give a relatively high magnitude signal to overcome the fluid bleed through the bleed conduit 70. This axially translates the spool 54 between two positions. To achieve axial translation, the flow rate between the multiplexer output 36 and the control chamber 60 during application of a fluid signal is sufficiently greater than the flow rate through the bleed conduit 70 so that adequate pressure differential exists across the valve to cause the spool 54 to axially translate. To provide adequate pressure differential, the bleed conduit has the restriction 72 that limits fluid flow between the working output port 62 and the control chamber 60. This restriction 72 is sized large enough so that sufficient fluid bleeds through the bleed conduit 70 to maintain the spool 54 in a latched position but small enough so that the fluid signal provided by the modulating valve 30 switches the spool 54 between positions.

What is claimed is:

1. A latching valve for controlling an actuator in a channel of a fluid control system, comprising:
   a valve body defining a control chamber, an inlet, an outlet, and a working output, the working output being connectable to an actuator, the control chamber adapted to receive control flow from a fluid control system;
   a movable valve operator translatable between a first and a second position inside the valve body, the first position allowing fluid communication between the outlet and the working output, and the second position allowing fluid communication between the inlet and the working output, the position of the valve operator being controlled by fluid pressure in the control chamber; and
   a bleed conduit in the latching valve fluidically connecting the control chamber and the working output, the bleed conduit allowing fluid to bleed therethrough to maintain a fluid pressure in the control chamber to thereby latch the movable valve operator in the first and the second position.

2. The valve of claim 1, wherein the inlet receives a first pressure from a fluid source and the outlet receives a second pressure from a fluid sump, the second pressure being less than the first pressure, and wherein an increase in fluid pressure in the control chamber translates the valve operator from the first to the second position.

3. The valve of claim 1, wherein the valve body further comprises a cylindrical bore, the bore being in fluid communications with the inlet, the outlet, and the working output, and wherein the movable valve operator comprises a spool axially translatable in the cylindrical bore to regulate fluid flow through the latching valve.

4. The valve of claim 3, further comprising a spring that axially biases the latching valve relative to the valve body.

5. The valve of claim 3 wherein the spool internally defines the bleed conduit.

6. A latching valve for controlling an actuator in a channel of a fluid control system, comprising:
   a control chamber connected to receive fluid signals from a fluid control;
   a valve operator responsive to the fluid signals to control a working output fluid flow to the actuator; and
   a bleed conduit fluidically connecting the control chamber with the working output flow, the control chamber operative to latch the valve operator in a current state by allowing fluid flow through the bleed conduit;
   wherein the latching valve further comprises a working output, an inlet for working hydraulic fluid flow, and an outlet for venting hydraulic fluid, the valve operator having a first and a second position, the first position allowing fluid communication between the inlet and the working output, the second position allowing fluid communication between the outlet and the working output.

7. The latching valve of claim 6, wherein the valve operator is a spool, and a valve body defines a bore in which the spool linearly translates.

8. The latching valve of claim 7, wherein the spool defines the bleed conduit.

9. The latching valve of claim 6 wherein the working output of the latching valve has a connection to a hydraulic multiplexer adapted to periodically update the latching valve at intervals, wherein flowthrough the bleed conduit is adapted to maintain a current state between intervals.

10. The system of claim 6, wherein the bleed conduit includes a restriction to limit a rate of fluid flow through the bleed conduit so that the rate of fluid flow through the bleed conduit is less than a rate of fluid flow between the fluid control and the control chamber during application of a fluid signal to the latching valve.

11. A latching valve for controlling an actuator in a channel of a fluid control system, comprising:
   a control chamber connected to receive fluid signals from a fluid control;
   a valve operator responsive to the fluid signals to control a working output fluid flow to the actuator, the working output fluid flow being controlled by a position of the valve operator, the position of the valve operator determined by a last fluid signal received in control chamber;
   a working output for working output fluid flow;
   an inlet for working hydraulic fluid;
   an outlet for venting hydraulic fluid wherein the valve operator connects one of the inlet and outlet to the working output depending upon the position of the valve operation; and
   latching means, associated with each latching valve, deriving a holding force from the working output fluid flow, for latching the valve operator in its last position.

12. The latching valve of claim 11, wherein the latching means comprises a bleed conduit defined within the latching valve that couples the working output flow to the fluid signals received by the latching valve.

13. The latching valve of claim 11, wherein the fluid control has positive and negative fluid signals.

14. The latching valve of claim 12 wherein the working output of the latching valve has a connection to a hydraulic multiplexer adapted to periodically update the latching valve at intervals, wherein flowthrough the bleed conduit is adapted to maintain a current state between intervals.

* * * * *